(12) United States Patent
Poulin (10) Patent No.: US 6,836,779 B2
(45) Date of Patent: Dec. 28, 2004

(54) NETWORK TRANSACTION METHOD

(76) Inventor: Christian D. Poulin, 29 Bay State Rd., Boston, MA (US) 02215

( * ) Notice: Subject to any disclaimer, the term of this patent is extended or adjusted under 35 U.S.C. 154(b) by 370 days.

(21) Appl. No.: 09/845,569

(22) Filed: Apr. 30, 2001

(65) Prior Publication Data

US 2002/0174107 A1 Nov. 21, 2002

Related U.S. Application Data

(60) Provisional application No. 60/275,377, filed on Mar. 13, 2001.

(51) Int. Cl.$^7$ .............................................. G06F 17/30
(52) U.S. Cl. .................... 707/103 R; 707/10; 707/100; 715/513
(58) Field of Search .............................. 707/2, 3, 4, 5, 707/100, 103 R, 10; 715/513

(56) References Cited

U.S. PATENT DOCUMENTS

| | | | | |
|---|---|---|---|---|
| 4,914,620 A | * | 4/1990 | Kihara et al. .................. 711/2 |
| 5,604,896 A | * | 2/1997 | Duxbury et al. .............. 703/26 |
| 5,857,187 A | * | 1/1999 | Uenoyama et al. ............. 707/8 |
| 5,884,022 A | * | 3/1999 | Callsen et al. ................ 714/22 |
| 5,978,847 A | * | 11/1999 | Kisor et al. ................. 709/227 |
| 6,055,543 A | * | 4/2000 | Christensen et al. ..... 707/104.1 |
| 6,092,035 A | * | 7/2000 | Kurachi et al. ................ 704/3 |
| 6,250,309 B1 | * | 6/2001 | Krichen et al. ............. 128/899 |
| 6,292,824 B1 | | 9/2001 | Siksa |
| 6,490,575 B1 | * | 12/2002 | Berstis ........................... 707/3 |
| 2002/0147847 A1 | * | 10/2002 | Brewster et al. ............ 709/246 |
| 2002/0174122 A1 | * | 11/2002 | Chou et al. .................. 707/100 |

FOREIGN PATENT DOCUMENTS

| | | | | |
|---|---|---|---|---|
| EP | 0859330 A1 | * | 8/1998 | ........... G06F/17/30 |
| EP | 0981097 A1 | * | 2/2000 | ........... G06F/17/30 |
| EP | 0986013 A2 | * | 3/2000 | ........... G06F/17/30 |
| EP | 1069515 A1 | * | 1/2001 | ........... G06F/17/30 |

OTHER PUBLICATIONS

Royappa, Implementing Catalog Clearinghouses with XML and XSL, ACM, 1998, pp. 616–623.*
Abitboul, On Views and XML, SIGMOD Record, vol. 28, No. 4, Dec., 1999, pp. 30–38.*
DeRose, XML Linking, ACM Computing Serveys, vol. 31, No. 4, Dec., pp. 1–12.*
Ishikawa et al., Querying Web Distributed Databases for XML–based E–Business: Requirement Analysis, Design, and Implementation, IEEE, pp. 60–67.*
Richard Han et al., WebSplitter: A Unified XML Framework for Multi–Device Collaborative Web Browsing, ACM, pp. 221–230.*

* cited by examiner

Primary Examiner—Frantz Coby
(74) Attorney, Agent, or Firm—Fish & Richardson P.C.

(57) ABSTRACT

A method of performing transactions over an electronic network includes defining data entries for objects represented in the network. The data entries including metadata represented as a web-readable document for an object and the entries including a keyword that represents network information or user process information related to the object. The method associates an object file with an entry that corresponds to the object being represented.

29 Claims, 7 Drawing Sheets

X-Data Entry

Section1: Meta Data
Through the use of HTML and XML tags, the X-Data object can be found and categorized.
→ Search Engine Section 2: Presentation
Includes hyper link, therefore the X-Data entry provides access to the object it is publishing.
→ File/Physical Item/User/Node Section 3: Process
Optionally includes a Script which provides X-Data entry the ability to interact as a network process.
→ Foreign X-Data Entry
→ Process

Figure 1A

X-Data Entry

Section1: Meta Data

Through the use of HTML and XML tags, the X-Data object can be found and categorized.

Search Engine

Section 2: Presentation

Includes hyper link, therefore the X-Data entry provides access to the object it is publishing.

File/Physical Item/User/Node

Section 3: Process

Optionally includes a Script which provides X-Data entry the ability to interact as a network process.

Foreign X-Data Entry

Process

Figure 1B

"Extended Metabase"

Figure 2

Extended Metabase Publishing Process

Figure 4

Search and Commerce Process

NETWORK TRANSACTION METHOD

CLAIM OF PRIORITY

This application claims priority under 35 USC §119(e) to U.S. Patent Application Ser. No. 60/275,377, filed on Mar. 13, 2001, the entire contents of which are hereby incorporated by reference.

BACKGROUND

This invention relates to network transactions.

Public computer networks now exist that allow many users to access the resources of the network around the clock. The resources available on a public network, e.g., the Internet, are usually defined as web-pages and accessible through the use of navigational tools, such as search engine programs. It is often the case that a user who attempts to find a specific resource on the network is frustrated in that attempt because of the number of ways that the resource can be defined, or defined to a specific site on the network (e.g., on the Internet, finding a specific item for sale may require searches on several web-sites, each of which may define the same item in a different way). Similarly, an attempt to find a specific user on the network is difficult because a user is not defined by a real name, instead, the user's actual address on the network may have little, if anything, in common with his or her real name. Furthermore, even when an resource or specific item is found, interaction with the resource or acquiring the item, is cumbersome.

A virtual network is defined as an interconnected group of networks that appear as one large network to a user. Virtual Private Networks (VPN) are private networks that are configured within a public network, such as the internet. VPN architectures provide a "tunnel" between various computers by "authenticating" data transfers between the computers included in the VPN. Virtual networks allow multiple users to interact and to access the resources in the network, i.e., the data files and users of the network. However, the resources on a virtual network are also difficult to find and interact with because all resources on the network may not be accessible to all users, and a particular user may not have the network information necessary to easily search for a resource.

SUMMARY

According to an aspect of this invention a method of performing transactions over an electronic network, the method includes defining x-data entries for objects represented in the network the x-data entries including metadata represented as a web-readable document for an object and the x-data entries including a keyword that represents network information or user process information related to the object and associating an object file with an x-data entry that corresponds to the object being represented.

One or more of the following features may also be included: wherein the object file includes a web-page document and including one or more keyword fields for filename, real-name, owner, program, process, public, private, cost, free, content, digital, physical or system and including an HTML tag as part of the metadata and including an XML tag as part of the metadata and using process information to define data stored as a keyword, the process information being derived from a process executed on a computer in the network and including an HREF link to the digital object file as part of the x-data entry and wherein the object file includes a process file which executes when the HREF is selected and providing a script process as part of the x-data entry for an object and wherein the script process includes a process which interacts with the object file, or, a second object file published by an x-data entry and wherein the script process includes a process which interacts with a file not published by an x-data entry and wherein the script process includes a process which uses authentication information to access the object file, or, to access a second object file published in the x-base and searching for an object based on a keyword, displaying a document page according to the metadata and displaying the HREF link and searching for an object based on a keyword, displaying a document page according to the metadata, displaying the HREF link and executing a script which is stored as part of the x-data entry and searching for an object based on a first keyword and purchasing the object through a commerce process, the commerce process using metadata information in the first keyword, or, on metadata information in a second keyword.

According to a further aspect of this invention a method of searching for an object over an electronic network, the method includes receiving a search query that is based on a keyword associated with the object, the object being represented by metadata and including the keyword representing network information or user process information related to the object.

One or more of the following features may also be included: receiving a query that includes one or more keywords for filename, real-name, owner, program, process, public, private, cost, free, content, digital, physical or system and returning to the sender of the query a database entry which includes a web-readable metadata section and returning to the sender of the query an HREF link and returning a script.

According to a further aspect of this invention a method of searching for an object over an electronic network includes sending a search query that is based on a keyword associated with the object, the object being represented by metadata and including the keyword representing network information or user process related to the object.

One or more of the following features may also be included sending a query that includes one or more keywords for filename, real-name, owner, public, private, cost, free, content, digital, physical or system.

According to a further aspect of this invention a computer program product residing on a computer readable medium for performing transactions over an electronic network includes instructions causing a computer to define x-data entries for objects represented in the network each of the x-data entries including metadata represented as a web-readable document for an object and including a keyword representing network information or user process information related to the object and search for one of the objects represented in the network, said search further includes instructions to cause a computer to form a query based on a keyword associated with the one object.

According to a further aspect of this invention a computer program product residing on a computer readable medium for performing transactions over an electronic network includes instructions causing a computer to send a query that is based on a keyword associated with an object, said keyword associated with a x-data entry which includes metadata represented as a web-readable document for the object.

One or more of the following features may also be included: instructions causing a computer to form a search query that includes one or more keywords for filename, real-name, owner, program, process, public, private, cost, free, content, digital, physical or system.

According to a further aspect of this invention a computer program product residing on a computer readable medium for performing transactions over an electronic network includes instructions causing a computer to receive a search query that is based on a keyword associated with an object, the keyword also associated with an x-data entry including metadata represented as a web-readable document for the object and search for the object based on the keyword in a database of published x-data entries.

One or more of the following features may also be included: instructions causing a computer to receive a search query that includes one or more keywords for filename, real-name, owner, public, private, cost, free, content, digital, physical or system and instructions causing a computer to return to the query source an x-data entry which includes a web-readable metadata section.

One or more of the following advantages may be provided by one or more aspects of the invention. Aspects of the invention are directed to a method which allows users, files and other resources on a virtual network to interact with the use of metadata defined objects that contain information related to the network or information related to a user process. The method provides a way to publish any object as an X-Data entry in an extended metabase and allows transactions to occur between defined objects. Each X-Data entry includes an extendible keyword section within both the XML and HTML tag sections allowing any type of object to be defined as an X-data object. The method provides the option of defining a physical item as an object on the network. Once an object is published by an X-Data entry, the object file represented by the entry can be found from the information contained in the entry using web-compatible search and commerce programs. Each X-Data entry may also include script sections which provide interaction with the object.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
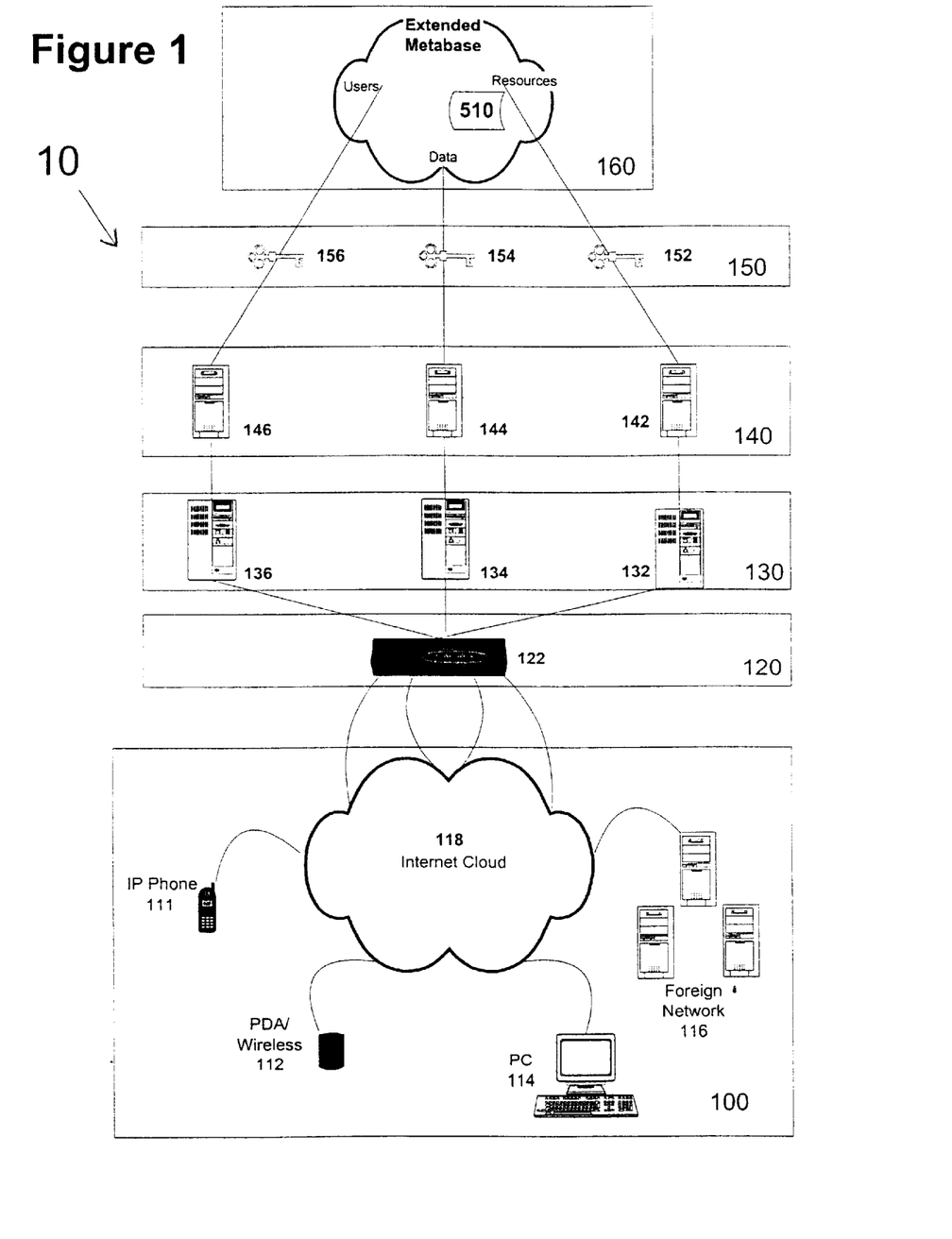
FIG. 1 shows an embodiment of an electronic network.

Referring to FIG. 1, a computer network 10 that provides communication, secure data transfer and user authentication between users is shown. Computer network 10 is configured to provide a virtual network, represented by layers 120, 130, 140, 150 and 160, to users accessing the virtual network through internet cloud 118. A user, or process, on the virtual network can then access the resources of the network by interacting with an Extended Metabase (X-Base) 160.

In operation, a user gains access to the virtual network by using an access device, for example, a network-enabled phone 111, a wireless computer 112, a personal computer 114 or a link from another network 116 and then connecting through the internet cloud 118 and through Virtual Private Network switch 122 to a Layer 130 computer. VPN switch 122 provides a secure encryption and decryption link of data packets to and from the internet cloud 118 and to the resources of the virtual network in layers 120, 130, 140 and 160. Layer 130 represents a computer, or computers, which execute software that authenticates data transfers through the VPN switch 122 to an access device in Layer 100.

Layer 140 represents a computer, or computers, which are executing software which authenticates users who will be allowed to access the resources of the virtual network. The Layer 140 user authentication software verifies a user's name and password before allowing access to network resources. A user logged-on to the virtual network, has "user process" information related to that log-on session, which includes username, password and system information related to the computer and network pathways utilized by a user to gain access to the virtual network. The user process information is used, in part, in building the X-Base entries, as will be explained. The Layer 140 user authentication software may be "Single Sign-On" software.

Layers 120, 130, and 140 are representative of different computers, and pathways, that may be included in a virtual network allowing multiple users to interact with an Extended Metabase 160 (X-Base). For instance, pathway 122,132,142 or pathway 122,134,144 or pathway 122,136, 146 may each represent different computers executing different operating systems and with different capabilities of data interpretation (e.g., computers configured as Web Servers, Legacy Systems or Authentication Systems).

The particular representation of computer network 10 is intended to be illustrative of the invention and not to be limiting in any way, one skilled in the art will recognize that other computer network configurations, as mentioned above, could be provided for interaction with the Extended Metabase 160. For example, one or more of the Layer 140 computers may be eliminated, where authentication of data and authentication of users can both be completed with processes executing on a Layer 130 computer. Similarly, the VPN switch 122 may not be necessary to configure a virtual network where one or more Layer 130 or Layer 140 computers are used to authenticate data and users.

Layer 150 represents a data translation layer, represented by processes 152,154 and 156, which are executed on the virtual network and allowing users of the network to interact with the Extended Metabase (X-Base) 160. X-Base 160 represents a database in the virtual network, and includes X-Data entry 510. Each X-Data entry 510 is "published" into the X-base by a publishing process, as will be explained.

Each X-Data entry 510 includes web-compatible data sections that include information about the user (owner) who created the entry and location information for finding and interacting with an "object file". Each object file represents an object accessible by the virtual network, where the object file may be accessible either within the virtual network, or as part of a public network, e.g., internet cloud 118. An object file may represent itself, that is if the object is a data file or web-page file. An object file may also be used to represent a user or a network resource (e.g., a printer, scanner, facsimile machine, or even a process). Furthermore, an object file may be used to represent a physical object that cannot be electronically present on the network, for example, a physical item can be published by an X-Data entry, and the object file can include Purchase Order information about the physical object. The object file may be stored in a database that is on the same computer system as the X-Base, or, it could be stored on any other computer system accessible to the network 10.

Tags are sets of data that identify various conditions about data in a file and is often found in the header records of such files. MetaTags are defined as digital data sets that identify the content of a web-page, usually as an HTML tag. Meta-Data are data sets that describe other data, for instance MetaTags contained within a MetaData database (a "MetaBase").

Each X-Data entry includes a MetaData section that includes keywords. The keywords allow any object to be represented and searched for using web-compatible search programs, i.e., by sending or receiving a search query that includes, or is based on, one or more metadata keywords. The MetaData keywords may be used to represent information about: the user (owner) of the entry, the user authentication process, and network location of the object file.

The metadata sections in each X-Data entry allows for any network resource, published in the X-Base, to be found using web-compatible search engines. The X-Data entries include both an HTML tag section and an XML tag section. However, any metadata language could be used to represent objects on a computer network.

HyperText Markup Language (HTML) is a common document format used on the World Wide Web. Web pages are often built with HTML tags, or codes, embedded in the text. HTML defines the page layout, fonts and graphic elements and a description (metadata) of the data on the page for the Web. The HTML tag may also include one or more hypertext links, HREF, to other documents. Each HREF link contains the URL, or address, of a Web page residing on the same server or any server worldwide. In general, HTML tags are used to describe the page being displayed. They are generally not used to index and find other data.

Extensible Markup Language (XML) is an open standard for describing data from the world wide web. It is used for defining data elements on a Web page and business-to-business documents. It uses a similar tag structure as HTML; however, whereas HTML was primarily designed to define how elements are displayed, XML explicitly defines what those elements contain. HTML uses predefined tags, but XML allows tags to be defined by the developer of the page. XML tags are often organized according to their content, an "XML Schema".

XHTML is another industry standard which has been introduced to combine HTML and XML data representations into a single representation recognizable by server computers which are executing only one of the standards. Generally, XHTML is used for presentation of web pages (HTML component) and a description of those pages (XML component). XHTML generally does not allow for a comprehensive representation of users, network resources, and physical objects.

Each HTML tag section within an X-Data entry, includes an extendible section of keywords within the 'METANAME' construct. Similarly, each XML tag section within an X-Data entry, includes an extendible section of keywords within the '<>' fields. The keywords used in the HTML and XML tag sections of an X-Data entry are provided during the publishing and definition process and include information extracted from the user process and network information associated with the object file. For instance, the username and password from the user process may be used as METANAME keywords. For instance, the hardware information related to the object file and the network protocol information associated with connecting to that object file may also be represented by keywords. The publishing process also allows a user to specify a cost for an object, and whether an object is a physical object. There may also be a keyword for the computer "system" where the object file is located or where the user log-in information is located. The following is an example of the METANAME/keyword construct in an X-Data entry:

<METANAME="keywords"CONTENT="

file.exe johndoe owner program process public private cost free content digital physical system.

In the above HTML tag example, the keywords are: file.exe, johndoe, owner, program, process, public, private, cost, free, content, digital, physical, and system.

Similarly, each XML tag section within an X-Data entry, includes one or more keywords within the '<>' fields, as follows:

```
<file.exe>
    <owner>johndoe</owner>
        <public>yes</public>
        <private>no</private>
        <cost>100.00</cost>
        <free>no</free>
        <content>
            <digital>yes</digital>
            <physical>no</physical>
        </content>
        <system>Win98</system>
</file.exe>
```

In the above XML tag example, the keywords are: file.exe, johndoe, public, private, cost, free, content, digital, physical, and system.

The HTML tag section and XML tag section, within each X-Data entry, include much of the same information in both tag sections. Therefore, the X-base data structure is usable and readable by any web-compatible software executed in the network 10, i.e., running software which is compatible with HTML or XML.

The X-Base is organized according to XML schema rules, using information contained within the XML tag section of each X-Data entry. However, other database organizational rules could be used to organize the X-Data entries included in the X-Base.

X-Data entry 510 also provides a way to interact with the object file by including a hyperlink reference section (HREF) to the object file. The HREF is provided during the publishing process by extracting information about the network location of the object file. The HREF provides the ability to display a link, and when selected causes a jump to the object file. Usually a HREF links to another web-page document. However, the HREF can also link to an object file that executes a software program. For instance, the HREF could link to an instant messenger program or an e-mail program for communication with a user or process.

X-data entry 510 may also include one or more "scripts". Scripts are code sections written in a general-purpose programming language used to augment the running of a program, e.g., Visual Basic Script (VBS). A script may provide a 'state' for each X-Data entry, that is, the ability for an X-Data entry to perform logical operations and interact as a process with files stored inside and outside the X-Base. For example, a searcher can find an X-Data entry and execute a script included in that entry which automatically links to the object file, or links to another web-page, and allows a direct 'log-on' with user and password information that was extracted from a user process during the publishing and definition processes. Another example would be a script which provides a search query for other files outside the X-Base that are defined by similar keywords in the first search which found the X-Data entry containing the script. Another example would be a script that is a standalone process and executes on a user's access device computer, such as a JAVAscript.

The script sections are provided as part of an X-Data entry during the publishing and definition processes. Utilizing the user process information, i.e., username and password, as well as network protocol information about the type and location of the object file, a script section, as discussed above, can provide for direct interaction with the object that is published as an X-Data object.

Figure 1A:
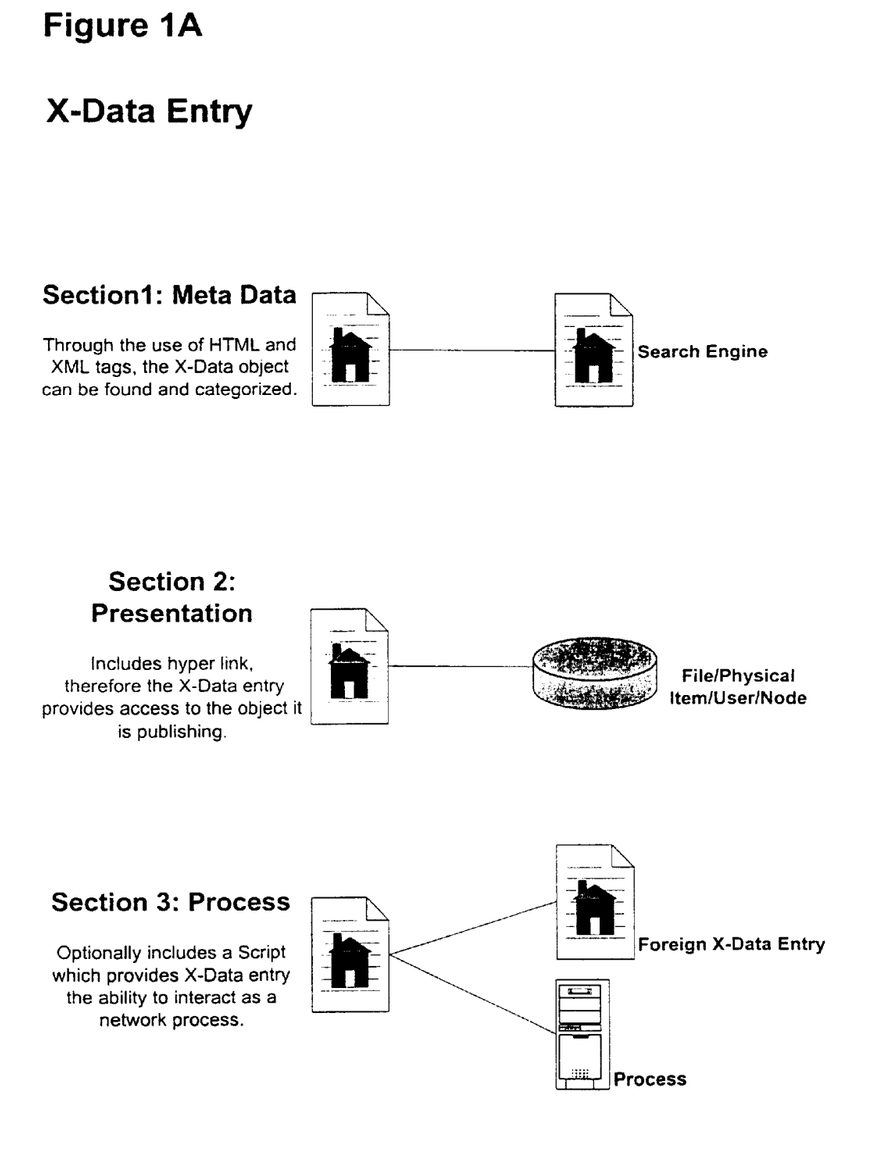
FIG. 1A shows an embodiment of an X-Data entry.

FIG. 1A shows the sections that can be included in an X-Data entry 510. Section 1 represents the XML and HTML metadata section. Section 2 represents the HREF section. Section 3 represents the optional script section.

Figure 1B:
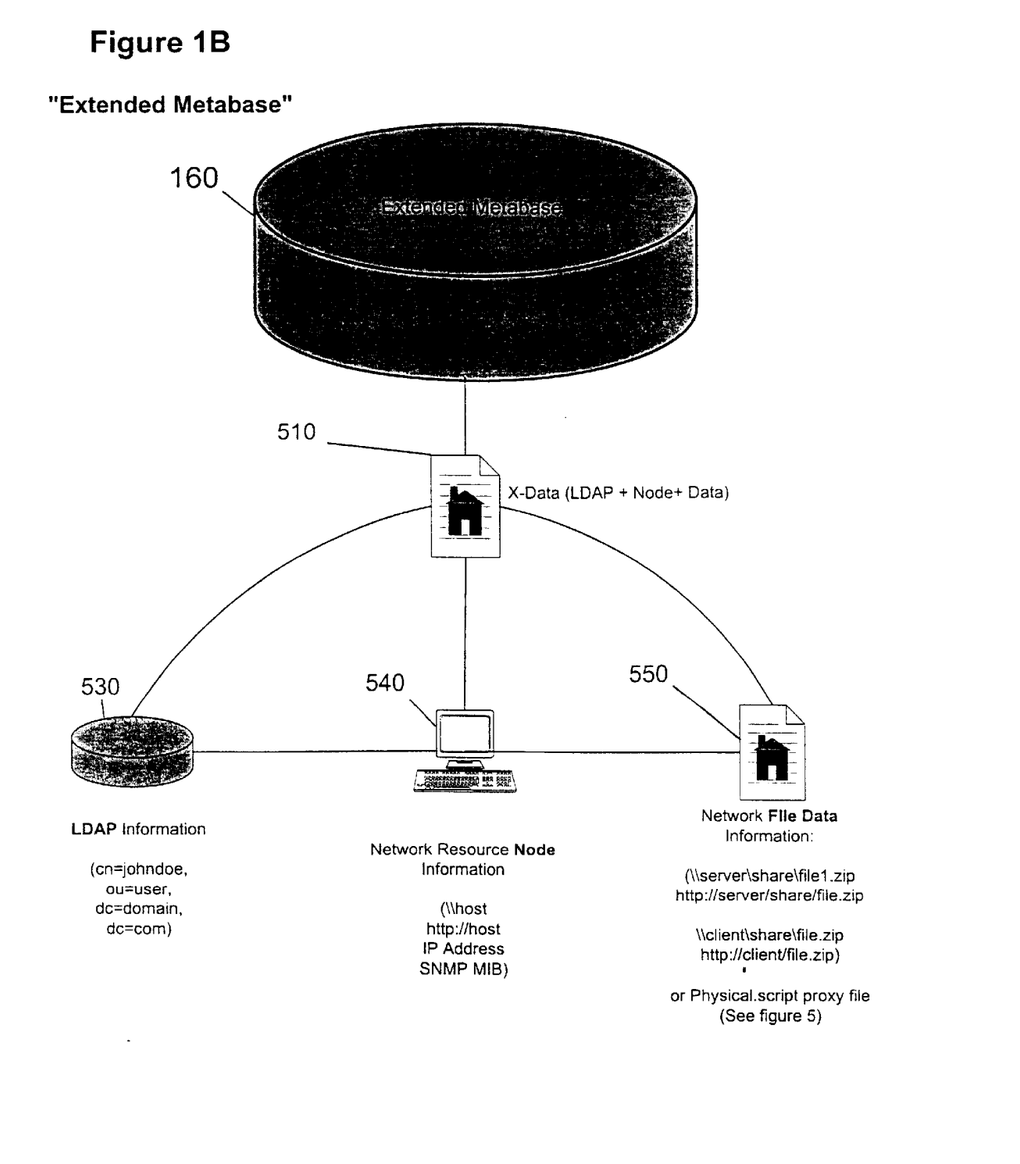
FIG. 1B shows an embodiment of an Extended Metabase.

FIG. 1B shows an exemplary X-Data entry 510 stored in the X-Base 160. As discussed above, some of the keywords in the metadata section may be derived from network information that is related to a user, a user process or an object file. Examples of network information which may be used to build an X-Data entry includes: LDAP information (Lightweight Directory Access Protocol) 530, (which provides information relevant to authentication mechanisms), Network Resource Node information 540, Network Node Reference (e.g., a '\\host' reference which represents a Universal Naming Convention), a 'http://host' reference which represents a name resolved web address, an IP address (for communicating with a TCP/IP protocol), or an SNMP (Simple Network Management Protocol, which may include a MIB reference (Management Information Base)). X-Data entry 510 may also include a Network Data File information 550 (usually denoted by UNC and HTTP).

Figure 2:
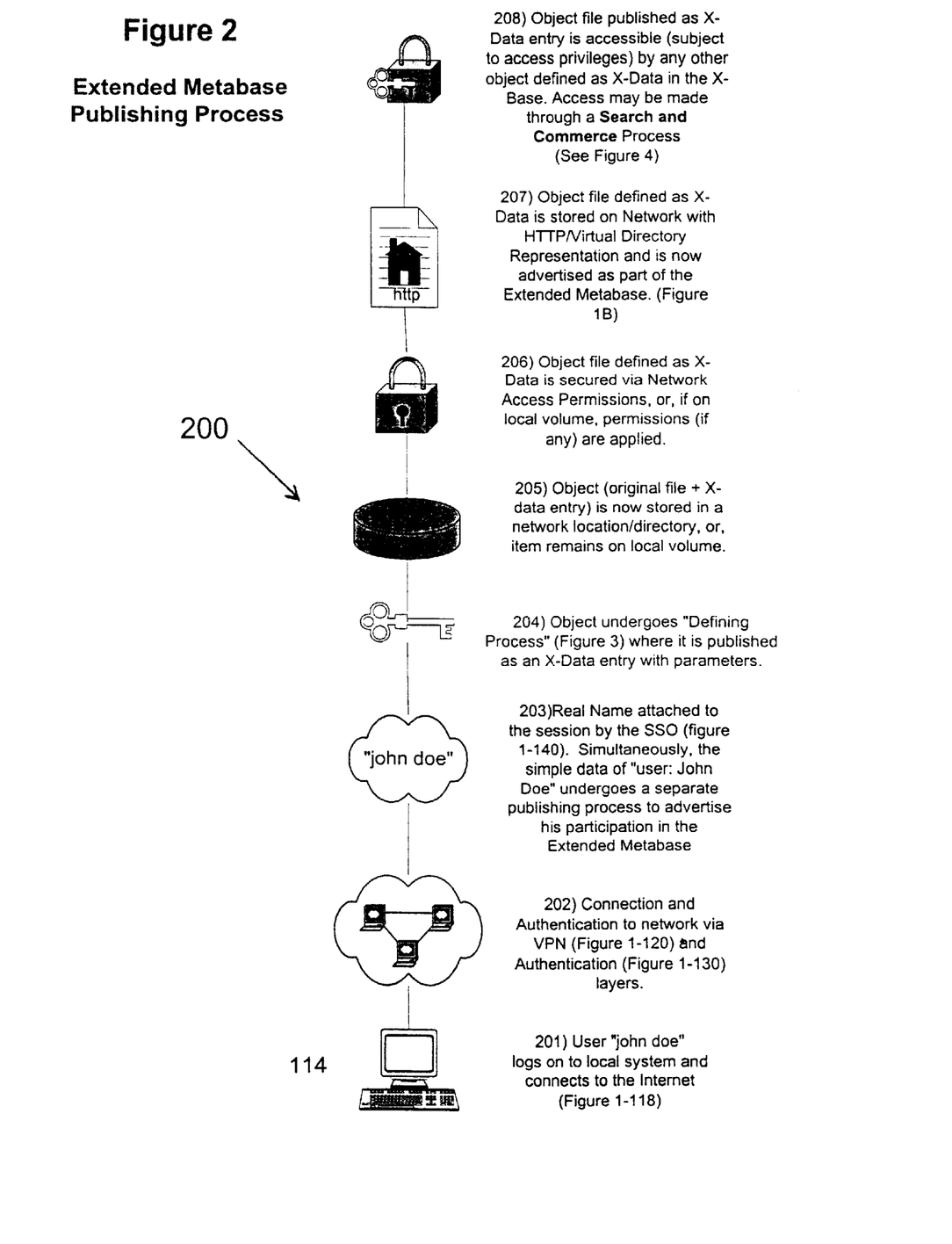
FIG. 2 shows an exemplary Metabase Publishing Process.
Figure 3:
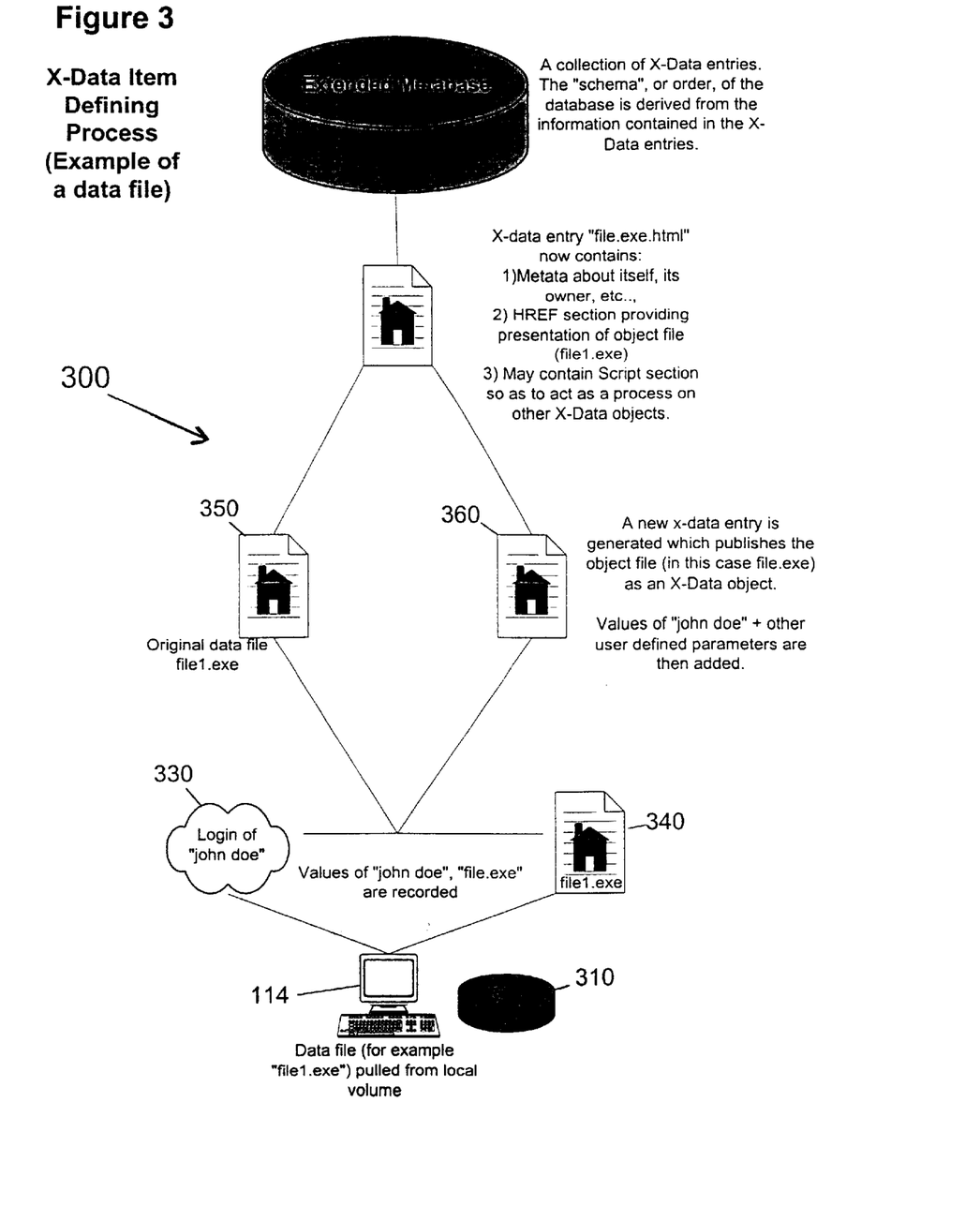
FIG. 3 shows an exemplary X-Data Object Defining Process.

Providing the Extended Metabase 160 includes a process by which an object is 'published' (i.e., represented), as an X-Data entry. FIG. 2 and FIG. 3 show a MetaData Publishing process 200 and an associated X-Data Defining Process 300 that represent software that may be executed on the network 10 in layer 150. Publishing process 200 includes logging on 201 to a local system through a client layer access device 114 and connecting to the Internet 118. Connecting 202 and authenticating to network 10 through a VPN 120 and an authentication layer computer (FIG. 1, layer 130). Attaching 203 a 'real name' to "john doe"s session by an SSO layer 140 computer. Jumping 204 to a "Defining Process" (FIG. 3) to define an X-Data entry.

Referring now to FIG. 3, the Defining Process 300 is shown. The Defining Process 300 is the process by which the X-Data entry is provided. As show in FIG. 3, 114 user 'john doe' chooses 'file1.exe' 340, from local volume 310, to publish as an object. The information about 'file1.exe' 340, user "john doe" 330 are included in the X-Data entry 360, and stored in the X-Base 370. At a minimum, at the completion of the Defining Process, the X-Data entry will contain the Metadata sections including keywords for 'file1.exe' 340 and for owner "john doe", and a HREF link to the object file. Defining process 300 may also include allowing user "john doe" to choose adding a script section to the X-Data entry.

Referring again to FIG. 2, following the completion of the Defining Process 300, file1.exe 340 and X-Data entry 360 are stored 205 in a network location or directory (or, at the user's option, the original file remains on the local volume). Access permissions are designated 206 for the data object represented by the X-Data entry. The access permissions may be set according to parameters derived by data translation scripts or from the values defined by the user. File1.exe is published 207 as an X-Data entry and stored on the network 10 with a HTTP representation. Publishing process 200, is completed 208, with file1.exe 340 and X-Data entry 510 protected by access privileges and represented via a Virtual Directory representation (HTTP representation) available on the network 10.

The publishing process 300 includes obtaining user process information from a user to be used as part of the X-Data entry. For instance, obtaining authentication information from a user session, network protocol information, such as LDAP, i.e., information on the network protocol a user is logged in through, is used by the publishing process and may be added as a keyword.

With X-Data entries stored in the X-Base, transactions between objects defined by the X-Data entries can now occur. To interact with the X-Base a user, or process, accesses the virtual network through a user authentication system (Layer 140), and can search the X-Base using a web-compatible search engine.

An example of two users, Harry and Tom, who are already published by X-Data entries, and having object files, Harry.exe and Tom.exe, respectively. Tom logs onto the system, and becomes authenticated to the network. Tom, as an authenticated user, can now interact with the X-Base. Tom, using any search program that is HTML or XML compatible, searches for 'Harry'. The search in the X-Base finds the X-Data entry which matches keyword =to 'Harry', and causes a web-page represented by either the HTML or XML information to be displayed on Tom's computer display and includes a HREF link to the object file, Harry.exe. Tom may select the link and cause a jump to the file referenced by the HREF. If the X-Data entry includes a script, the script may be executed on Tom's access device or through his log-on session on a Layer 130 computer.

Figure 4:
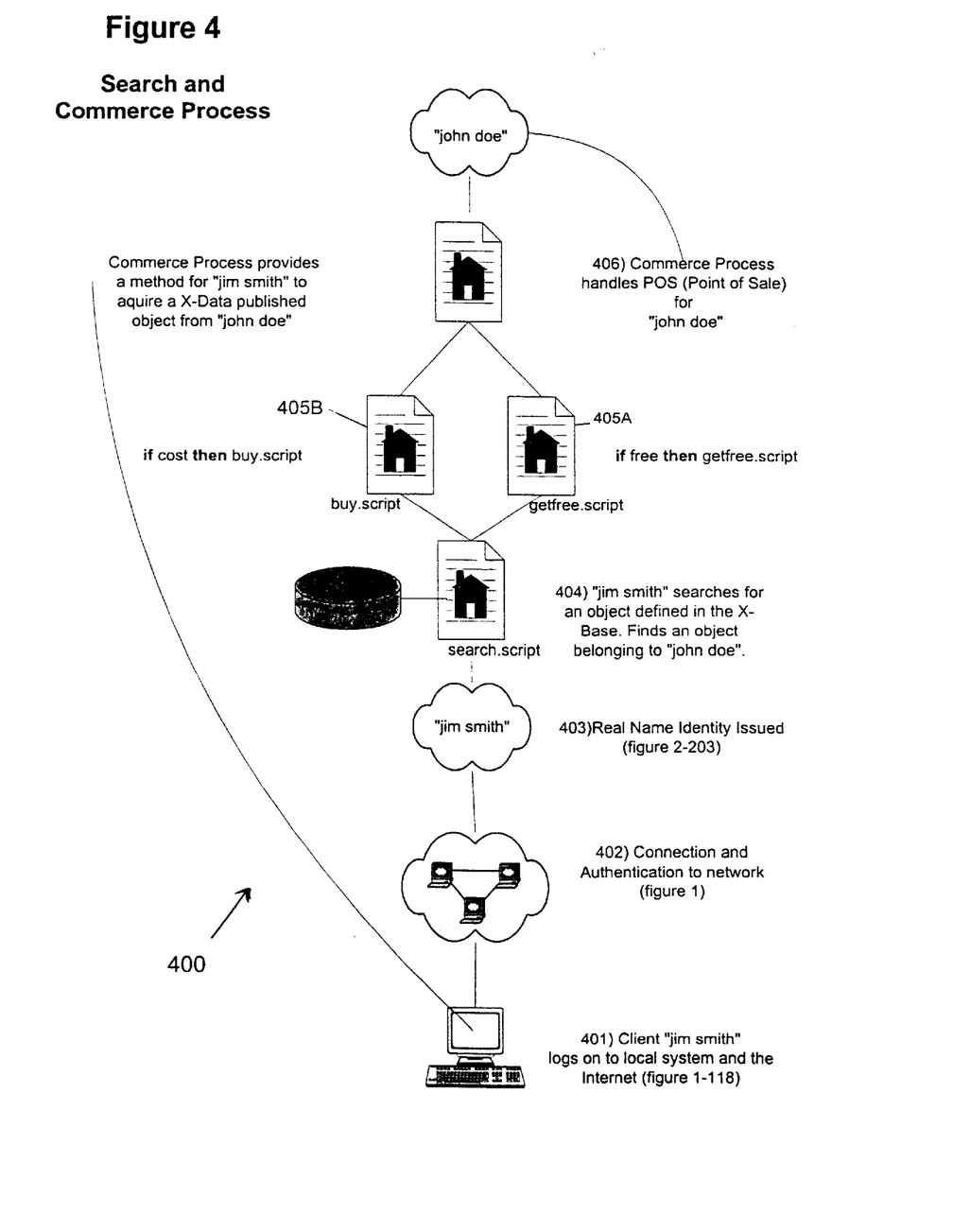
FIG. 4 shows an exemplary Search and Commerce Process.

FIG. 4 shows a Search and Commerce Process 400, which includes user "jim smith" logging on 491 to local system 114, and connecting to the virtual network. The 'real name' of "jim smith" is attached 403 to user "jim smith". "Jim smith" searches 404 for an object using search.script (e.g., an application service process). Specifically, object "jim smith" can search the X-Base according to a keyword for any object he wishes to find. If an object is published in the X-Base which matches his search parameters, search.process returns or displays the object files found in the X-Base. In 405A/450B, if an object matching "jim smith"s search request is found, then "jim smith" can execute either a buy.process 405B or a getfree.process 405A, in order to retrieve the object published by the X-Data entry. That is, if an X-Data keyword includes a "cost" for the object then buy.process may be executed to purchase the object. Conversely, if the keywords designated the object as "free", then the getfree.process may be executed to transfer the object to "jim smith" for free. In either case, "free" or "cost", in 406 a commerce process will complete the transaction and transfer the object (or make the object available on the network). The important concept underlying search and commerce process 400 is that searching and commerce can be completed using a search based on the keyword information contained within the X-Data entries.

Referring again to FIG. 4, if the object found and purchased is available in digital format, then a Commerce process facilitates the transfer of the actual object to the purchaser. However, if the X-Data entry identifies an object that is a representation of a physical object, then a purchase order or shipping address may be returned to the searcher. In one embodiment, a physical object found and purchased can trigger an actual shipping authorization to a shipping company to pick-up and deliver a the physical object defined in the X-Base.

Figure 5:
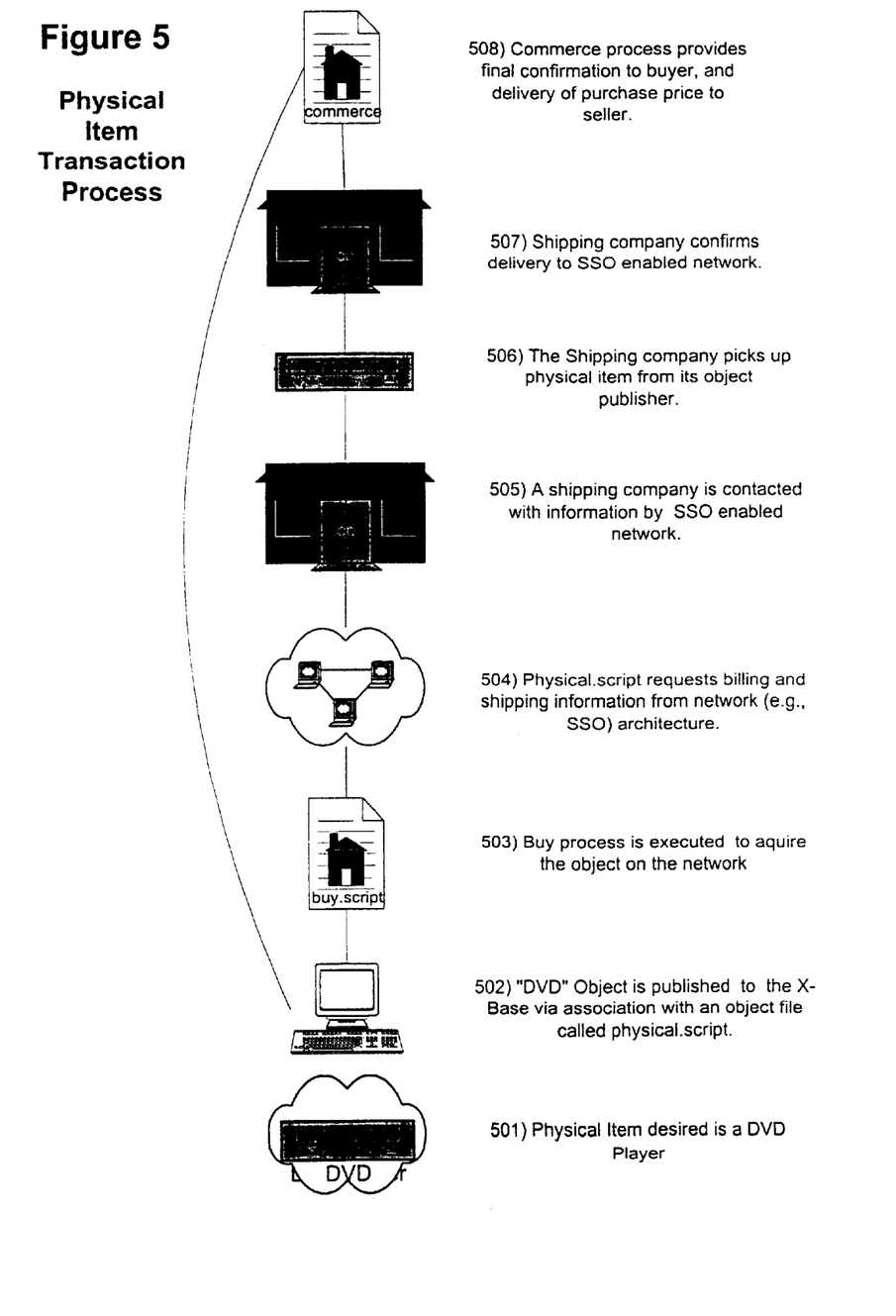
FIG. 5 shows an exemplary Physical Item Transaction Process.

Referring to FIG. 5, a physical item transaction process is shown. As an example, Digital Video Disc player (DVD) 501 has been previously published as an X-Data entry, with the object file being 'physical.script'. The X-Data entry for the DVD 501 may include additional identifiers which indicate that the object is 'not physical', along with a 'cost' associated with the object. In 502, a user searches for an X-Base entry 'DVD' and a match is found for DVD 501. In 503 buy.process is executed to initiate a purchase and delivery of the DVD 501. In 504, a physical.script is executed which requests billing a shipping information from the network (i.e., data translation process will request and update information from the SSO). In 505 a shipping company is contacted with the shipping information related to the actual physical location of the object, along with information on the seller 'object' and the purchaser, In 506 the shipping company picks up the object from the seller (object publisher), and in 507 the shipping company delivers the object to the purchaser, and confirms delivery of the object to the X-Base. A commerce process 508 is executed to complete purchase price delivery to the seller 'object' and confirm delivery to the purchaser 'object'.

Aspects of the invention are directed to a method which allows users, files and other resources on a virtual network to interact with the use of metadata defined objects that contain information related to the network. The method provides a way to publish any object as an X-Data entry in an extended metabase and allows transactions to occur between defined objects. Each X-Data entry includes an extendible keyword section within both the XML and HTML tag sections allowing any type of object to be defined as an X-data object. The method provides the option of defining a physical item as an object on the network. Once an object is published by an X-Data entry, the object file represented by the entry can be found from the information contained in the entry using web-compatible search programs. Once an object is found, the object represented by the X-Data entry can then be purchased and delivered using a web-compatible commerce program. Each X-Data entry may also include script sections which provide interaction with the object.

Other embodiments are within the scope of the following claims.

What is claimed is:

1. A method of performing transactions over an electronic network, the method comprises;
   defining x-data entries for objects represented in the network the x-data entries including metadata represented as a web-readable document for an object and at least a first one of an HTML tag including an extendible section of one or more keywords and an XML tag including an extendible section of one or more keywords with the one or more keywords representing network information or user process information related to the object; and
   associating an object file with an x-data entry that corresponds to the object being represented.

2. The method of claim 1 wherein the object file comprises a web-page document.

3. The method of claim 1 wherein defining x-data entries further comprises:
   including one or more keyword fields for filename, realname, owner, program, process, public, private, cost, free, content, digital, physical or system.

4. The method of claim 3 wherein the HTML tag is part of the metadata.

5. The method of claim 3 wherein the XML tag as h part of the metadata.

6. The method of claim 3 wherein including one or more keyword fields further comprises:
   using process information to define data stored as a keyword, the process information being derived from a process executed on a computer in the network.

7. The method of claim 3 wherein defining x-data entries for objects further comprises:
   including an HREF link to the digital object file as part of the x-data entry.

8. The method of claim 7 wherein the object file comprises a web-page document.

9. The method of claim 7 wherein the object file comprises a process file which executes when the HREF is selected.

10. The method of claim 7 wherein defining x-data entries for objects to be represented on the network, further comprises:
    providing a script process as part of the x-data entry for an object.

11. The method of claim 10 wherein the script process comprises a process which interacts with the object file, or, a second object file published by an x-data entry.

12. The method of claim 10 wherein the script process comprises a process which interacts with a file not published by an x-data entry.

13. The method of claim 10 wherein the script process comprises a process which uses authentication information to access the object file, or, to access a second object file published in the x-base.

14. The method of claim 7 further comprising:
    searching for an object based on a keyword;
    displaying a document page according to the metadata; and
    displaying the HREF link.

15. The method of claim 7 further comprising:
    searching for an object based on a keyword;
    displaying a document page according to the metadata;
    displaying the HREF link; and
    executing a script which is stored as part of the x-data entry.

16. The method of claim 7 further comprising:
    searching for an object based on a first keyword; and
    purchasing the object through a commerce process, the commerce process using metadata information in the first keyword, or, on metadata information in a second keyword.

17. A method of searching for an object over an electronic network, the method comprises:
    receiving a search query that is based on a keyword associated with the an object, the object being represented by metadata and defined by x-data entries including metadata represented as a web-readable document for the object and at least a first one of an HTML tag section including an extendible section of one or more keywords and an XML tag section including an extendible section of one or more keywords with the one or more keywords representative network information or user process information related to the object; and searching for the object based on the search query.

18. The meted of claim 17 wherein receiving a query that is based on a keyword further comprises receiving a query tat includes one or more keywords for filename, real-name, owner, program, process, public, private, cost, free, content, digital, physical or system.

19. The method of claim 17 further comprising:

returning to the sender of the query a database entry which includes a web-readable metadata section.

20. The method of claim 19 wherein returning a database entry includes returning to the sender of the query an HREF link.

21. The method of claim 19 wherein returning a database entry includes returning a script.

22. A method of searching for an object over an electronic network comprises:

sending a search query that is based on a keyword associated with an object, the object being represented by metadata and defined by x-data entries including metadata represented as a web-readable document for the object and at least a first one of an HTML tag section including an extendible section of one or more keywords and an XML tag section including an extendible section of one or more keywords with the one or more keywords representing network information or user process information related to the object; and searching for an object based on the search query.

23. The method of claim 22 wherein sending a query that is base on a keyword further comprises:

sending a query that includes one or more keywords for filename, real-name, owner, public, private, cost, free, content, digital, physical or system.

24. A computer program product residing on a computer readable medium for performing transactions over an electronic network comprising instructions causing a computer to:

define x-data entries for objects represented in the network each of the x-data entries including metadata represented as a web-readable document for an object and at least a first one of an HTML tag section including an extendible section of one or more keywords and an XML tag section including an extendible section of one or keywords with the one or more keywords representing network information or user process information related to the object; and search for one of the objects represented in the network, said search further comprising instructions to cause a computer to:

form a query based on a keyword associated with the one object.

25. A computer program product residing on a computer readable medium for performing transactions over an electronic network comprising instructions causing a computer to:

send a query that is based on a keyword associated with an object, said keyword associated with a x-data entry which includes metadata represented as a web-readable document for the object and at least a first one of an HTML tag section including an extendible section of one or more keywords and an XML tag section including an extendible section of one or more keywords with the one or more keywords representing network information or user process information related to the object; and search for an object based on the search query.

26. The product of claim 25 further comprises instructions causing a computer to:

form a search query that includes one or more keywords for filename, real-name, owner, program, process, public, private, cost, free, content digital, physical or system.

27. A computer program product residing on a computer readable medium for performing transactions over an electronic network comprising instructions causing a computer to:

receive a search query that is based on a keyword associated with an object, said keyword also associated with an x-data entry including metadata represented as a web-readable document for the object and at least a first one of an HTML tag section including an extendible section of one or more keywords and an XML tag section including an extendible section of one or more keywords with the one or more keywords representing network information or user process information related to the object; and search for the object based on the keyword in a database of published x-data entries.

28. The product of claim 27 further comprises instructions causing a computer to:

receive a search query that includes one or more keywords for filename, real-name, owner, public, private, cost, free, content, digital, physical or system.

29. The product of claim 27 further comprising instruction causing a computer to:

return to the query source an x-data entry which includes a web-readable metadata section.

* * * * *